3,361,533
PROCESS FOR THE PRODUCTION OF HYDROGEN PEROXIDE FROM ITS ELEMENTS
George Wallace Hooper, Norton-on-Tees, England, assignor to Imperial Chemical Industries Limited, London, England, a corporation of Great Britain
No Drawing. Filed June 17, 1963, Ser. No. 288,455
Claims priority, application Great Britain, June 21, 1962, 23,930/62; Oct. 25, 1962, 40,433/62
13 Claims. (Cl. 23—207)

This invention relates to the production of hydrogen peroxide and to processes of oxidation using hydrogen peroxide.

Up to the present time hydrogen peroxide has been produced industrially mainly by processes which involve either anthraquinones from which the separation of hydrogen peroxide is tedious, or else by electrolysis of ammonium bisulphate between platinum electrodes, which process is expensive. It has also been proposed to produce hydrogen peroxide by the direct union of hydrogen and oxygen but no efficient process of this type has so far been devised. We have now found a new and advantageous process by which hydrogen peroxide can be made in considerably higher yield by contacting hydrogen and oxygen with a suitable solid catalyst in a liquid medium capable of inhibiting the decomposition of hydrogen peroxide.

According to the invention there is provided a process for the production of hydrogen peroxide which comprises contacting hydrogen and oxygen with a solid catalyst in the liquid phase in the presence of water, an acid and a non-acidic oxygen-containing organic compound.

By non-acidic is meant not more acidic than water. Thus the non-acidic oxygen-containing organic compounds which may be used are alcohols, aldehydes, ketones, ethers, esters, amides and oxygen-containing amines. Carboxylic acids on the other hand are of limited effectiveness in fulfilling the function of the oxygen-containing organic compound and are excluded from the scope of the invention.

In one preferred embodiment of the invention the acid is at least as strong as acetic acid and is more preferably an acid having an inorganic acidic radical. Conveniently there is used one or more of the following: sulphuric acid, nitric acid, hydrofluoric acid, hydrochloric acid, hydrobromic acid, phosphoric acid and sulphonic acids. Of these acids hydrochloric acid and sulphuric acid give especially favourable results. In another preferred embodiment the acid is one whose anion has catalyst poisoning properties: as examples of such acids there may be mentioned hydrogen sulphide and hydrogen cyanide. Mixtures of acids containing more than one from each of the above embodiments or of acids from both embodiments may be used. The acid concentration is preferably in the range 0.01 N to 2 N.

In addition to the acid there is preferably present also one or more second acid radicals selected from the following list: sulphate, nitrate, fluoride, chloride, bromide, cyanide, cyanate, thiocyanate and phosphate. The concentration of such acid radicals may be the same as that of the above-mentioned acids. Preferably there is present at least one of the above radicals which are halogen or pseudo-halogen acid radicals, especially chloride, to the extent of a least $10^{-5}$ N, especially in the range $10^{-4}$ N to 0.1 N. Concentrations above 0.1 N may be used, for example N, but no advantage is obtained thereby as a rule. It is within the scope of the invention to have present, in addition to the acid, a salt which provides the required second acid radical.

As preferred classes of non-acidic oxygen-containing organic compounds there may be mentioned alcohols and ketones especially those having a solubility in water of at least 1% at room temperature, that is, alcohols and ketones containing up to about 8 carbon atoms per oxygen atom. Thus the lower aliphatic mono-alcohols containing up to 8 carbon atoms may be used and more especially those having up to 4 carbon atoms which are miscible with water at room temperature. Similarly the lower aliphatic ketones containing up to 8 carbon atoms may be used, more especially acetone, methyl ethyl ketone and cyclopentanone. Acetone produces especially good results. These organic compounds are preferably used in solution in the aqueous acid solution; and in order to enhance solubility more than one of them may be present if desired. If however the solubility of a particular compound is low and is not sufficiently increased by the presence of another oxygen-containing compound, then that compound is preferably emulsified. If the oxygen-containing organic compound is basic then the amount of acid present must of course be more than equivalent to the amount of base.

The proportion of non-acidic oxygen-containing organic compound to water is preferably more than 20:80 and especially from 40:60 to 90:10 by volume.

It is believed that the acid, the organic oxygen-containing compounds and the second acid radical each function by deactivating those centres in the catalyst which promote the decomposition of hydrogen peroxide, but the invention is not limited by this postulated mechanism. The non-acidic organic oxygen-containing compound also accelerates the formation of hydrogen peroxide.

The solid catalysts in the process of the invention preferably contain as metallic component at least one element from Group I or Group VIII of the Periodic Table. Of these metals, gold, platinum and palladium appear to be best. Palladium is especially effective.

Conveniently the metallic component of the catalyst is palladium either alone or alloyed or mixed with a minor proportion of one or more other metals, especially gold or platinum. The pure metal or metal mixture may be used in colloidal form if desired but preferably is supported on a carrier, preferably forming 1%–10% of the total catalyst by weight. The carrier may for example be a refractory oxide such as for example alumina (for example active e.g. gamma alumina), silica, silica-alumina, titanium dioxide, zirconium dioxde or beryllium oxide or may be graphite or silicon carbide. One suitable form of silica has an external surface area of approximately 1 m.$^2$ per g. Thus an effective catalyst consists of 5% palladium on silica, and this catalyst may be prepared by dissolving a palladium compound such as for example palladium chloride ($PdCl_2$) in the minimum amount of an acid such as for example dilute hydrochloric acid, adsorbing this solution on finely powdered silica having an external surface area of approximately 1 m.$^2$/g., evaporating to dryness, and reducing the palladium chloride to palladium metal by means of hydrogen at a suitable temperature, for example 50° C.–400° C. More preferable catalysts are supported on silica-alumina on or silica-gel having a medium specific surface of for example 200 to 400 m.$^2$/g.

In the preferred method of carrying out the process the supported catalyst is maintained in suspension in a liquid by vigorous agitation and a mixture of hydrogen and oxygen preferably in equimolecular proportions is passed in. The hydrogen and oxygen may be diluted in order to decrease or remove the risk of accidental explosion, hence conveniently the oxygen is supplied as air. The process appears to be safe when using hydrogen-oxygen mixtures in the explosive range provided the gas mixture does not come into contact with dry catalyst. The pressure and temperature at which the gases are passed into the solution may vary over a wide range.

Conveniently the gases may be passed into solution at room temperature, but hydrogen peroxide is produced at a higher concentration if a lower temperature (for example in the range 0° C. to −20° C. or below) is employed. If a higher total pressure than atmospheric (that is, 1 part hydrogen +4 parts air, giving a partial pressure of 0.16 atmosphere of each gas) is employed (for example 75 atmospheres of a mixture of 4% hydrogen, 4% oxygen and 92% nitrogen, giving a partial pressure of 3 atmospheres for each gas) again hydrogen peroxide at a higher concentration is produced.

As a further feature of the invention there is provided a process of oxidation which comprises contacting an oxidisable substance in the liquid phase with hydrogen peroxide produced by contacting hydrogen and oxygen with a solid catalyst capable of promoting the combination of hydrogen and oxygen to give hydrogen peroxide.

It is preferred that the hydrogen peroxide formed by the combination of hydrogen with oxygen should be contacted with the oxidisable substance very soon after it has been formed, for example in the reaction vessel in which it is being formed. Thus in one form the oxidation process comprises passing hydrogen and oxygen into a water-containing liquid phase containing an oxidisable substance and a solid catalyst capable of catalysing the combination of hydrogen with oxygen to give hydrogen peroxide.

It has been found advantageous in the oxidation process according to the invention to promote the decomposition of the hydrogen peroxide in the presence of the oxidisable substance. Thus there is provided a process of oxidation which comprises contacting in a water-containing liquid phase hydrogen and oxygen with a solid catalyst capable of catalysing the formation of hydrogen peroxide, contacting the formed hydrogen peroxide with an oxidisable substance, and promoting the decomposition of the hydrogen peroxide.

The decomposition of the hydrogen peroxide may be promoted by chemical means for example by compounds which can enter into an electron transfer reaction with the hydrogen peroxide, or by radiation for example ultraviolet light and high energy radiations such as X- and gamma-rays and the radiations such as alpha and beta particles produced in nuclear transformations.

Within the scope of this invention the solid catalyst with which the hydrogen and oxygen are contacted to form hydrogen peroxide may itself act as the promoter of the decomposition of the hydrogen peroxide. It is however preferred to have a separate promoter for the decomposition of the hydrogen peroxide: preferably in order to inhibit the decomposition of the hydrogen peroxide by the solid catalyst itself there is present an acid or a second acid radical as hereinbefore defined or a non-acidic oxygen-containing organic compound as hereinbefore defined or more than one of these and the decomposition of the hydrogen peroxide is promoted by a homogeneous catalyst or by radiation.

It is believed that for the oxidation process of the invention the hydrogen peroxide molecules should decompose with the formation of at least one hydroxyl radical. When the electron transfer reaction mentioned above takes place there is also formed a hydroxyl ion, according to the equation.

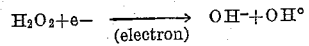

$$H_2O_2 + e^- \text{ (electron)} \longrightarrow OH^- + OH°$$

As examples of chemical compounds which can enter into an electron transfer reaction with hydrogen peroxide there may be mentioned salts of metals which are capable of existing in more than one valency state. Following the theory outlined above such compounds promote the decomposition of hydrogen peroxide by providing a cation which by increasing its oxidation level provides the necessary electron. The over-all electron transfer reaction is represented by the ionic equation:

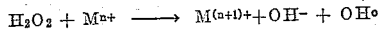

$$H_2O_2 + M^{n+} \longrightarrow M^{(n+1)+} + OH^- + OH°$$

In the above equation M represents a transition metal. Conveniently the metal is in the lowest valency state in which it can exist as a cation. Of the transition metal salts it is convenient to use the salts of the metals of Group VIII of the Periodic Table of element, particularly iron salts. Preferably the iron is in its divalent state. Other suitable metallic salts include salts of copper, silver, thallium, lead, antimony, bismuth, chromium and tin. The metallic salt is preferably a salt of an inorganic acid, provided that the anionic constituent of such a salt does not tend strongly to form an ionic complex with the cationic constituent of the salt. Sulphates are particularly convenient. A trace, for example $10^{-2}$–$10^{-4}$ M of metallic salt is all that is normally required, but more than such a trace amount may be present if desired.

It is not always necessary for the liquid medium for this process of oxidation to contain an oxygen-containing organic compound, but when it is, ketones and alcohols are suitable. The concentration of such a compound is preferably as already described for the hydrogen peroxide formation process. Acetone is a particularly convenient ketone to use. When acetone is present in the liquid medium it is necessary to ensure that the medium is not too acidic for then the hydrogen peroxide decomposes by a side reaction and does not take part in the oxidation process of this invention. For example when sulphuric acid is present in the liquid medium the acid should preferably have a normality of less than 3, especially 0.01 to 2.

The conditions of temperature, pressure, nature and concentration of catalyst, of acid (if any) and of second acid radical (if any) for the process of oxidation are the same as have been defined above for the hydrogen peroxide production process. The process of oxidation is applicable to inorganic and organic substances.

As examples of inorganic substances which may be oxidised there may be mentioned sulphonic acids for example chlorosulphonic acid, from which results a mixture of the per-sulphuric acids, permonosulphuric acid $H_2SO_5$ (Caro's Acid) and per-disulphuric acid $H_2S_2O_8$. For these reactions no decomposition catalyst is necessary.

Organic substances which may be oxidised include aliphatic hydrocarbons for example cyclohexane (to give cyclohexanol and cyclohexanone), aromatic hydrocarbons for example benzene (to give phenol), and olefines especially those containing up to 8 carbon atoms (to give the corresponding glycols for example ethylene glycol, 1:2-dihydroxycyclohexane, asym-dimethyl ethylene glycol and trimethyl ethylene glycol). Advantageously hydroxylation catalysts for example osmium tetroxide, vanadium pentoxide or molybdenum trioxide may be present in the oxidation of olefines.

When the process is carried out in a liquid medium the substance to be oxidised may be soluble in the liquid medium, but where it has only a limited solubility preferably it is emulsified.

In one method of carrying out the above defined oxidation process the catalyst with which the hydrogen and oxygen are contacted to form hydrogen peroxide and the liquid medium containing the substance to be oxidised are vigorously agitated together. The product of the oxidation process is separated from the liquid medium by for example distillation or liquid extraction, after sufficient reaction has taken place.

In another method of carrying out the oxidation process the liquid medium containing the substance to be oxidised is passed over a bed of the catalyst counter-current to a stream of hydrogen and oxygen.

As a particular feature of this invention there is provided a process for producing an aromatic hydroxy compound especially a phenol which comprises contacting hydrogen and oxygen with a solid catalyst capable of catalysing the formation of hydrogen peroxide, contacting the formed hydrogen peroxide with an aromatic hydrocarbon and promoting the decomposition of the hydrogen peroxide. Preferably the oxidation process is conducted in the liquid medium in which the hydrogen peroxide is produced, the said liquid medium preferably containing also an acid and a second acid radical as hereinbefore defined.

Thus for example there is provided a process for the oxidation of benzene to phenol which comprises passing a mixture of hydrogen and oxygen (as air) into a stirred mixture of benzene, aqueous sulphuric and hydrochloric acids, ferrous sulphate, and finely divided 5% palladium-on-silica catalyst. The product phenol is separated from the reaction mixture or by solvent extraction.

The invention is illustrated by the following examples:

EXAMPLE 1

A mixture of 1 part by volume of hydrogen and 4 parts of air at room temperature and atmospheric pressure was passed at a rate of 25 litres per hour into 50 ml. of an aqueous acetone solution (approximately 30 ml. of acetone) which was $10^{-2}$ N in hydrochloric acid and N in sulphuric acid, and in which was suspended 1 g. of finely divided 5% palladium-on-silica catalyst.

The gaseous mixture was passed into the solution for about 30 minutes, after which time 12.5 mg. of hydrogen peroxide was recovered.

The catalyst was prepared by dissolving palladium chloride ($PdCl_2$) in the minimum amount of dilute hydrochloric acid and applying the solution to finely powdered silica having an external surface area of approximately 1 m.² per gm. The solution was evaporated to dryness in a current of nitrogen at 60° C. and the palladium chloride reduced to palladium metal by heating in hydrogen at approximately 400° C.

EXAMPLE 2

*Effect of the presence of the non-acidic oxygen-containing organic compound*

Hydrogen peroxide preparations were carried out by passing a mixture of 1 part by volume of hydrogen and 4 parts of air at room temperature and atmospheric pressure and at the rate of 25 litres per hour into 50 ml. of a normal solution of sulphuric acid in a mixture of acetone (75% by volume) and water (25% by volume). The solution contained suspended in it 1 g. of finely powdered 5% palladium on silica-gel catalyst. After 30 minutes' operation, during which all the passed in hydrogen and oxygen appeared to be absorbed, the reaction mixture was sampled and titrated with $N/10$ potassium permanganate. From the titration results it was calculated that 46 mg. of hydrogen peroxide had been formed per 10 ml. of reaction mixture. In a similar run in which chloride ($10^{-4}$ N) was present, added either as hydrochloric acid or as sodium chloride, the same yield of hydrogen peroxide was obtained. In a control run in which sodium chloride and sulphuric acid were present but the medium was wholly aqueous, the yield of hydrogen peroxide was only 3.4 mg.

EXAMPLE 3

*Effect of various oxygen-containing organic compounds*

Hydrogen peroxide preparations were carried out by passing a mixture of 1 part by volume of hydrogen and 4 parts of air at room temperature and atmospheric pressure and at the rate of 25 litres per hour into 50 ml. of a solution of sulphuric acid (N) and hydrochloric acid ($10^{-4}$ N) containing suspended in it 1 g. of finely powdered 5% palladium on silica-gel catalyst. The solvent for this solution consisted of various oxygen-containing organic compounds, usually mixed with water. The quantities of hydrogen peroxide produced per 10 ml. of solution in 30 minutes' operation are shown in Table 1.

TABLE 1

| Oxygen-containing organic compound and its concentration in the solvent | Quantity of hydrogen peroxide formed (mg.) | Remarks |
|---|---|---|
| None | 3.4 | One phase present. |
| Acetone: | | |
| 5 | 8.0 | Do. |
| 25 | 12.4 | Do. |
| 50 | 27.9 | Do. |
| 75 | 44.2 | Do. |
| 100 | 0.0 | Do. |
| Methyl Ethyl Ketone, 25 | 7.7 | Two phases present. |
| Methyl Ethyl Ketone, 25 / Acetone, 5 | 9.7 | One phase present. |
| Methyl Ethyl Ketone, 25 / Acetone, 25 | 17.7 | Do. |
| Cyclopentanone, 25 | 9.5 | Do. |
| Cyclopentanone, 25 / Acetone, 10 | 9.7 | Do. |
| Cyclohexanone, 25 / Acetone, 25 | 8.4 | Do. |
| Methanol, 25 | 7.2 | Do. |
| Isopropanol: | | |
| 25 | 7.5 | Do. |
| 75 | (¹) | Run stopped because of explosive reaction. |
| Tert butanol, 25 | 7.0 | Two phases present. |
| Dioxan, 25 | 5.8 | One phase present. |
| Tetrahydrofuran, 25 | 5.8 | Do. |
| Ethyl acetate, 25 | 6.8 | Two phases present. |

¹ Not available.

It is apparent that considerably increased yields of hydrogen peroxide result from the presence of ketones, alcohols, ethers and esters, the ketones especially acetone being most effective.

EXAMPLE 4

*Effect of the second acid radical on yield of hydrogen peroxide*

Hydrogen peroxide preparations were carried out using the process described in Example 2 using hydrochloric acid at two concentrations. The yield of hydrogen peroxide was measured after 30 minutes' and after 2 hours' operation. The results are shown in Table 2.

TABLE 2

| Hydrochloric acid concentration | Hydrogen peroxide yield in mg. per 10 ml. of solution after— | |
|---|---|---|
| | 30 minutes | 2 hours |
| $10^{-4}$ N | 53.8 | 10.6 |
| $10^{-2}$ N | 41.2 | 77.5 |

It is clear that chloride has the effect of inhibiting the decomposition of the hydrogen peroxide which has been formed.

EXAMPLE 5

*Effect of temperature on yield of hydrogen peroxide*

Hydrogen peroxide preparations were carried out at 10° C., 0° C. and −10° C. by passing a mixture of hydrogen (4 litres per hour) with air (20 litres per hour) into 50 ml. of a solution in 75% acetone+25% of water (by volume) of sulphuric acid (0.1 N) and hydrochloric acid ($10^{-2}$ N), in which was suspended 1 g. of a finely divided catalyst consisting of 5% palladium supported on silica gel. During each run further solution (without catalyst) was added to the reactor to prevent an undue rise in the concentration of hydrogen peroxide. Samples of the solution were withdrawn after 30, 60 and 90 minutes' reaction and analysed for hydrogen peroxide by titration with potassium permanganate solution. The quantity of hydrogen peroxide present per 10 ml. of solution is shown in Table 3.

TABLE III

| Temperature, °C. | Hydrogen peroxide (mg.) per 10 ml. of solution after— | | |
|---|---|---|---|
| | 30 mins. | 60 mins. | 90 mins. |
| 10 | 62.3 | 75 | 76.6 |
| 0 | 76.5 | 98.2 | 97.2 |
| −10 | 121.5 | 155 | 155 |

It is clear that as the working temperature is decreased a higher stationary concentration of hydrogen peroxide becomes possible.

EXAMPLE 6

*Effect of pressure on yield of hydrogen peroxide*

Hydrogen peroxide preparations were carried out at 1 atmosphere total pressure and at 75 atmospheres total pressure under the following conditions:

catalyst—5% palladium on silica gel: 1 g. used;
volume of reaction mixture—50 ml. initially;
liquid medium—75% acetone, 25% water, by volume;
sulphuric acid—N;
hydrochloric acid—$10^{-2}$ N;
temperature—0° C.;
gas composition—hydrogen 4%, oxygen 4%, nitrogen 92%.

The quantity of hydrogen peroxide (mg.) per 10 ml. of solution present after 15 minutes' operation was as follows:

1 atmosphere total 2.55
75 atmospheres total 67.3

EXAMPLE 7

*Effect of catalyst support on yield of hydrogen peroxide*

Hydrogen peroxide preparations were carried out by the procedure of Example 2 in the presence of sulphuric acid (N) and hydrochloric acid ($10^{-2}$ N) in a 75% acetone, 25% aqueous medium, using for each a 5% palladium catalyst on a different support. Each catalyst had been made as described in Example 1 except that the reduction temperature was 150° C. Table 4 shows the specific surface of each carrier used (where known) and the quantity of hydrogen peroxide produced per 10 ml. of solution after 30 minutes' and after 2 hours' operation, as shown by titration of the reaction mixture with N/10 potassium permanganate.

TABLE IV

| Support | Specific Surface, metres² per gram | Hydrogen Peroxide formed (mg.) | |
|---|---|---|---|
| | | 30 min. | 2 hrs. |
| Titanium dioxide | (¹) | 10.2 | 17 |
| Charcoal | 450 | 10.5 | 11.6 |
| Alumina (high surface) | 172 | 10.7 | 13.6 |
| Silica (high surface) | 420 | 17.0 | 27.2 |
| Silica (steam sintered) | (¹) | 10.2 | 18.7 |
| Silicon carbide | (¹) | 13.2 | 18.7 |
| Alumina (medium surface) | 96 | 18.3 | 36.2 |
| Silica (low surface) | 1.0 | 22.8 | 30.8 |
| Alumina 10%, Silica 90% | 330 | 32 | 41.2 |
| Silica gel | 275 | 52 | 90 |

¹ Not available.

It appears that a considerable variety of supports can be used, the best being silica of medium surface and silica-alumina being substantially better than the rest.

EXAMPLE 8

*Use of other metals as catalysts for hydrogen peroxide formation*

Hydrogen peroxide preparations were carried out as described in Example 7 except that as catalysts there were used silica gel impregnated with (a) a mixture of 2% gold and 3% of palladium and (b) 5% of platinum. The quantity of hydrogen peroxide present per 10 ml. of solution using the gold-palladium catalyst was 19.1 mg. after 30 minutes' operation and 27.4 mg. after 2 hours' operation. Using the platinum catalyst the quantity of hydrogen peroxide present was 7.15 mg. after 30 minutes' operation and 7.7 mg. after 2 hours' operation.

EXAMPLE 9

*Production of phenol from benzene*

(a) A mixture of 1 part of hydrogen by volume and 4 parts of air at room temperature and atmospheric pressure was passed at a rate of 25 litres per hour into 55 ml. of a vigorously stirred liquid medium in which was suspended 1 gm. of a finely powdered palladium-on-silica catalyst. The liquid medium consisted of 5 ml. of benzene and 50 ml. of an aqueous solution of sulphuric acid (N) and hydrochloric acid ($10^{-2}$) N in which was dissolved 50 mg. of ferrous sulphate ($3.6 \times 10^{-3}$ M). After two hours' operation the mixture was extracted with benzene. In the benzene extract 38 mg. of phenol were present.

(b) Similar preparations were carried out with neither sulphuric acid nor hydrochloric acid and with hydrochloric acid only. Hydrogen peroxide was formed in both preparations but the quantity formed in the absence of hydrochloric acid was only two thirds of that formed in its presence.

(c) In a further preparation differing from (a) only in that no hydrogen was used no phenol could be detected in the reaction mixture after 2 hours' operation.

(d) A preparation was carried out under the following conditions:

catalyst—5% palladium on silica gel: 0.5 g. used;
volume of reaction mixture—6 ml. benzene+19 ml. water;
sulphuric acid—none;
hydrochloric acid—$10^{-2}$ N;
ferrous sulphate (heptahydrate)—2.5 mg. ($3.6 \times 10^{-4}$ M);
temperature—0° C.;
pressure (total)—75 atmospheres;
gas composition—hydrogen 4%, oxygen 4%, nitrogen 92%.

After 10 minutes' operation 28.5 mg. of phenol were present in the reaction mixture.

EXAMPLE 10

*Production of cyclohexanol and cyclohexanone from cyclohexane*

The reaction conditions in this example were similar to those in Example 9(a) except that the liquid medium consisted of 5 ml. of cyclohexane, 47.5 ml. of acetone and 12.5 ml. of an aqueous solution of sulphuric acid (4 N) and hydrochloric acid ($4 \times 10^{-2}$ N) in which was dissolved 50 mg. ferrous sulphate. After 2 hours' stirring the mixture was analyzed by vapour-phase chromatography. It was found that 75 mg. of cyclohexanol and 105 mg. of cyclohexanone had been produced.

In a preparation which was similar except that no hydrogen was used, no cyclohexanol or cyclohexanone was formed.

EXAMPLE 11

*Synthesis of trimethylethyleneglycol*

A mixture of 1 part of hydrogen by volume and 4 parts of air at room temperature and atmospheric pressure was passed at the rate of 25 litres per hour into a vigorously stirred solution consisting essentially of 37.5 ml. of acetone, 12.5 ml. of 0.4 N aqueous sulphuric acid, 0.5 m. of 0.01 N aqueous hydrochloric acid, 10 ml. of 2-methyl-butene-2, 1 gm. of finely powdered 5% palladium-on-silica catalyst and 0.025 g. of osmium tetroxide. The external area of the silica support of the catalyst was about 1 m.²/g. After 5 hours' operation analysis by vapour phase chromatography showed trimethylethyleneglycol to be present in the reaction mixture.

EXAMPLE 12

*Synthesis of asym-dimethylethylene glycol*

The process of Example 11 was repeated with the difference that 2-methyl-butene-2 was omitted from the liquid reaction mixture and isobutene was passed in the gas stream at the rate of 0.25 litres per hour. After 24 hours' operation analysis by vapour-phase chromatography showed that asym-dimethylethylene glycol was present in the reaction mixture.

EXAMPLE 13

*Synthesis of trimethylethylene glycol*

The process of Example 11 was repeated with two differences, namely that the osmium tetroxide was omitted and the palladium-on-silica catalyst was replaced by a palladium-on-tungstic oxide catalyst. After 24 hours' operation trimethyethylene glyocl was found to be present in the reaction mixture.

What is claimed is:

1. A process for the production of hydrogen peroxide which comprises contacting hydrogen and oxygen with a solid catalyst which contains at least one element from Group I or Group VIII of the Periodic Table in the liquid phase in the presence of water, an acid at least as strong as acidic acid, and a non-acetic oxygen-containing organic compound selected from the group consisting of alcohols, aldehydes, ketones, ethers, esters, amides and oxygen-containing amines.

2. A process according to claim 1 wherein the acid has an inorganic acidic radical.

3. A process according to claim 1 wherein the acid concentration is in the range 0.01 N to 2 N.

4. A process according to claim 1 wherein the acid is selected from the group consisting of hydrocyanic acid and hydrogen sulphide.

5. A process as claimed in claim 1 wherein there is present a second acid radical which is a halogen radical.

6. A process according to claim 5 wherein the concentration of the second acid radical is in the range $10^{-4}$ N to 0.1 N.

7. A process according to claim 1 wherein there is present a second acid radical which is a pseudo-halogen radical.

8. A process as claimed in claim 1 wherein the non-acidic oxygen-containing organic compound is at least one alcohol having a solubility in water of at least 1% at room temperature.

9. A process as claimed in claim 1 wherein the non-acidic oxygen-containing compound is at least one ketone having a solubility in water of at least 1% at room temperature.

10. A process according to claim 1 wherein the solid catalyst contains as metallic component at least one element selected from the group consisting of gold, platinum and palladium.

11. A process according to claim 10 wherein the metallic component is supported on a carrier selected from the group consisting of refractory oxides, silicon carbide and graphite.

12. A process according to claim 11 wherein the catalyst consists of 1% to 10% of palladium supported on silica gel having a specific surface in the range 200 to 400 m.$^2$/g.

13. A process as claimed in claim 1 wherein the proportion of the non-acidic oxygen-containing organic compound to water in the mixture is betwen 40:60 and 90:10.

References Cited

UNITED STATES PATENTS

| | | | |
|---|---|---|---|
| 1,108,752 | 8/1914 | Henkel et al. | 23—207 |
| Re. 25,114 | 1/1962 | Hood et al. | 23—207 |
| 3,003,853 | 10/1961 | Mecorney et al. | 23—207 |
| 3,004,831 | 10/1961 | Hungerford et al. | 23—207 |
| 2,386,372 | 10/1945 | Wagner | 260—586 |
| 2,609,395 | 9/1952 | Dougherty et al. | 260—586 |
| 2,392,875 | 1/1946 | Porter | 260—621 |
| 2,415,101 | 2/1947 | Krieble et al. | 260—621 |
| 2,373,942 | 4/1945 | Bergsteinssen | 260—635 |
| 2,850,540 | 9/1958 | Frank et al. | 260—635 |

FOREIGN PATENTS

| | | |
|---|---|---|
| 600,788 | 6/1960 | Canada. |
| 1,129,462 | 5/1962 | Germany. |

OTHER REFERENCES

Schumb et al.: "Hydrogen Peroxide" pp. 571–575 (1955).

OSCAR R. VERTIZ, *Primary Examiner.*

LEON ZITVER, *Examiner.*

M. JACOBS, H. S. MILLER, *Assistant Examiners.*